(12) United States Patent
Kim

(10) Patent No.: US 11,417,299 B1
(45) Date of Patent: Aug. 16, 2022

(54) STRING INSTRUMENT FOR EDUCATIONAL USE

(71) Applicant: Minhong Kim, Yongin-si (KR)

(72) Inventor: Minhong Kim, Yongin-si (KR)

( * ) Notice: Subject to any disclaimer, the term of this patent is extended or adjusted under 35 U.S.C. 154(b) by 0 days.

(21) Appl. No.: 17/696,301

(22) Filed: Mar. 16, 2022

(30) Foreign Application Priority Data

Mar. 26, 2021 (KR) .......................... 10-2021-0039537

(51) Int. Cl.
*G10D 1/05* (2020.01)
*G10D 3/14* (2020.01)
*G10D 3/10* (2006.01)

(52) U.S. Cl.
CPC ................. *G10D 1/05* (2020.02); *G10D 3/10* (2013.01); *G10D 3/14* (2013.01)

(58) Field of Classification Search
CPC .............. G10D 1/05; G10D 3/10; G10D 3/14
See application file for complete search history.

(56) References Cited

U.S. PATENT DOCUMENTS

| | | | | |
|---|---|---|---|---|
| 1,364,217 A * | 1/1921 | Surratt | ..................... | G10D 3/06 84/267 |
| 3,854,370 A * | 12/1974 | Sapinski | ................. | G10D 1/05 84/293 |
| 4,020,730 A * | 5/1977 | Hill | .......................... | G10D 1/05 84/286 |
| 4,024,787 A * | 5/1977 | Larson | ..................... | G10H 1/34 984/107 |
| 4,031,801 A * | 6/1977 | Cecchini | ................ | G09B 15/06 84/173 |
| 5,756,914 A * | 5/1998 | Streibl | ................... | G09B 15/06 84/293 |
| 5,811,704 A * | 9/1998 | Anderko | ................ | G09B 15/06 84/291 |
| 6,127,615 A * | 10/2000 | Rosenberg | ............. | G09B 15/06 84/267 |
| 7,230,175 B2 * | 6/2007 | Whiteside | .............. | G10H 1/342 84/465 |
| 7,262,354 B2 * | 8/2007 | Orred | ....................... | G10D 3/06 84/293 |
| 7,304,224 B1 * | 12/2007 | Bettis | ..................... | G09B 15/06 84/293 |
| 8,124,863 B2 * | 2/2012 | Van Wagoner | ........ | G09B 15/06 84/293 |

(Continued)

FOREIGN PATENT DOCUMENTS

JP         3806068 B2    8/2006
KR   10-2014-0137225 A   12/2014

*Primary Examiner* — Robert W Horn
(74) *Attorney, Agent, or Firm* — KORUS Patent, LLC; Seong Il Jeong

(57) ABSTRACT

The present invention relates to an educational string instrument comprising: a body provided with a head portion and a bottom portion; a nut installed on the head portion; a saddle installed on the bottom portion; a plurality of fixing parts installed on an outer side of the nut of the body; a plurality of tuning devices installed on an outer side of the saddle of the body; a plurality of strings supported by the fixing parts and the tuning devices and installed to be spaced apart from the body by the nut and the saddle, and a single fret installed to be inwardly spaced apart from an inner side of the nut to form a fingerboard part and functioning for raising an original note of the string by a semitone.

11 Claims, 7 Drawing Sheets

(56) References Cited

U.S. PATENT DOCUMENTS

| | | | | |
|---|---|---|---|---|
| 8,618,398 | B2* | 12/2013 | Van Wagoner | G10D 1/08 |
| | | | | 84/465 |
| 8,642,859 | B1* | 2/2014 | Valenti | G10D 1/08 |
| | | | | 84/293 |
| 9,280,957 | B1* | 3/2016 | Chaves | G10D 1/05 |
| 10,984,673 | B2* | 4/2021 | Weinraub | G10D 1/08 |
| 2006/0011048 | A1* | 1/2006 | Koster | G10H 3/18 |
| | | | | 84/723 |

* cited by examiner

STRING INSTRUMENT FOR EDUCATIONAL USE

FIELD OF THE INVENTION

The present invention relates to an educational string instrument capable of playing a chromatic scale, by using a single fret and a diatonic scale arrangement of a string instrument to facilitate playing melody and chord.

BACKGROUND OF THE INVENTION

Musical instruments are an old invention that has been with human history and use various materials and structures to produce notes. Especially, strings are convenient to adjust the pitch of notes through differences in thickness, length, and tension, and suitable for expressing various tones depending on materials. For this reason, various string instruments have been devised and developed.

The most well-known string instruments are piano in which strings are hammered, and guitar, ukulele, lyre, and harp, which are played with fingers or picks, and violin, which is played using a bow.

First of all, the piano or keyboard family produce sound by striking strings using a keyboard and a hammer. In particular, the great advantage of piano is that white keys of piano have an arrangement of a natural major, which is the standard for music scale, such as C major scale. Since basic music and staff music are based on a natural major scale, piano is suitable for playing melody and chord. However, it also has a critical disadvantage in that it becomes very difficult to play when key signature is changed.

Second, the guitar family is designed to make multiple notes from one string by using more than 12 frets on the fingerboard. Frets are a very useful structure that allows an instrument to have less strings. Since the number of strings reduces, the structures of instruments can be simplified, and portability can increase. However, they have a disadvantage in that it is difficult to learn due to complexity of the frets.

Third, the lyre family is a portable instrument that makes beautiful sound. However, lyra with a chromatic scale arrangement has a disadvantage in that the size of the instrument increases due to a large number of strings, and lyra with a diatonic scale arrangement has a disadvantage in that music that can be played are limited, and thus, it is difficult to be used for actual performance or education.

Fourth, since the violin family has a fingerboard, it has an advantage of producing various notes from one string. However, since there are no frets on the fingerboard, it takes a very long time to play the right notes with accuracy, and it is not suitable for playing chords.

As such, the conventional musical instruments have various disadvantages in that instruments with many strings increase in size and are complicated to play, and instruments with too few strings have good portability but have only few playable music. Accordingly, there is a need to develop an instrument to make up for these disadvantages.

DETAILED DESCRIPTION OF THE INVENTION

Technical Problems

The present invention has been devised to solve the problems mentioned above. The main purpose of the present invention is to provide an educational string instrument that is configured to have only two notes per string so that a user can conveniently learn a musical scale and to have a relatively wide note range so that it can also be suitable as a performance device.

SUMMARY OF THE INVENTION

An educational string instrument according to an embodiment of the present invention devised in order to solve the above problems may comprise: a body provided with a head portion and a bottom portion; a nut installed on the head portion; a saddle installed on the bottom portion; a plurality of fixing parts installed on an outer side of the nut of the body; a plurality of tuning devices installed on an outer side of the saddle of the body; a plurality of strings supported by the fixing parts and the tuning devices and installed to be spaced apart from the body by the nut and the saddle, and a single fret installed to be inwardly spaced apart from an inner side of the nut to form a fingerboard part and functioning for raising an original note of the string by a semitone.

Here, the body may be provided with a sound hole formed in a center thereof.

Here, each of the plurality of strings may be tuned according to a natural major scale.

Here, the strings may be 7 or more.

Here, the single fret may be formed throughout the plurality of strings.

Here, the fingerboard may be marked with key labels.

Here, the tuning devices may be installed alternately.

Here, the head portion of the body may be formed to be curved outward, and the bottom portion of the body is formed to be curved inward.

Here, the body may be made of wood and has a plate shape.

Here, the plurality of strings may be the same type of string, and as each of the strings goes in a transverse direction, a connection length of each of the strings may be configured to be shorter in sequence and make a higher note.

Here, as each of the strings goes in a transverse direction, a thickness of each of the strings may be configured to be thinner in sequence and make a higher note.

Technical Effects of the Invention

According to the embodiment of the present invention with the configuration above, since the present invention has a natural major scale arrangement, which is an advantage of string instruments, a user can intuitively learn sound of each string and can play the instrument immediately.

In the case of playing a score with a key signature, such as sharp # or flat ♭, which is the most difficult part to learn in an instrument, the present invention enables a user to play the score simply by pressing or fingering a fret of a string corresponding to a note with a key signature with one hand without changing the shape of the other hand.

In the case of playing chords, the present invention enables a user to easily play chords by skipping one note in a natural major scale arrangement while keeping the shape of the hand in the same position.

In addition, the present invention can be played with various playing techniques such as arpeggios and strokes.

Furthermore, a string instrument of the present invention is suitable both for stage performance and music education because of its compact size and good portability.

DETAILED DESCRIPTION FOR THE INVENTION

Hereinafter, an educational string instrument according to preferred embodiments of the present invention will be described in detail with reference to the drawings. In the present specification, the same and similar reference numbers are assigned to the same and similar components in different embodiments, and description in different embodiments is replaced with the first description.

Figure 1:
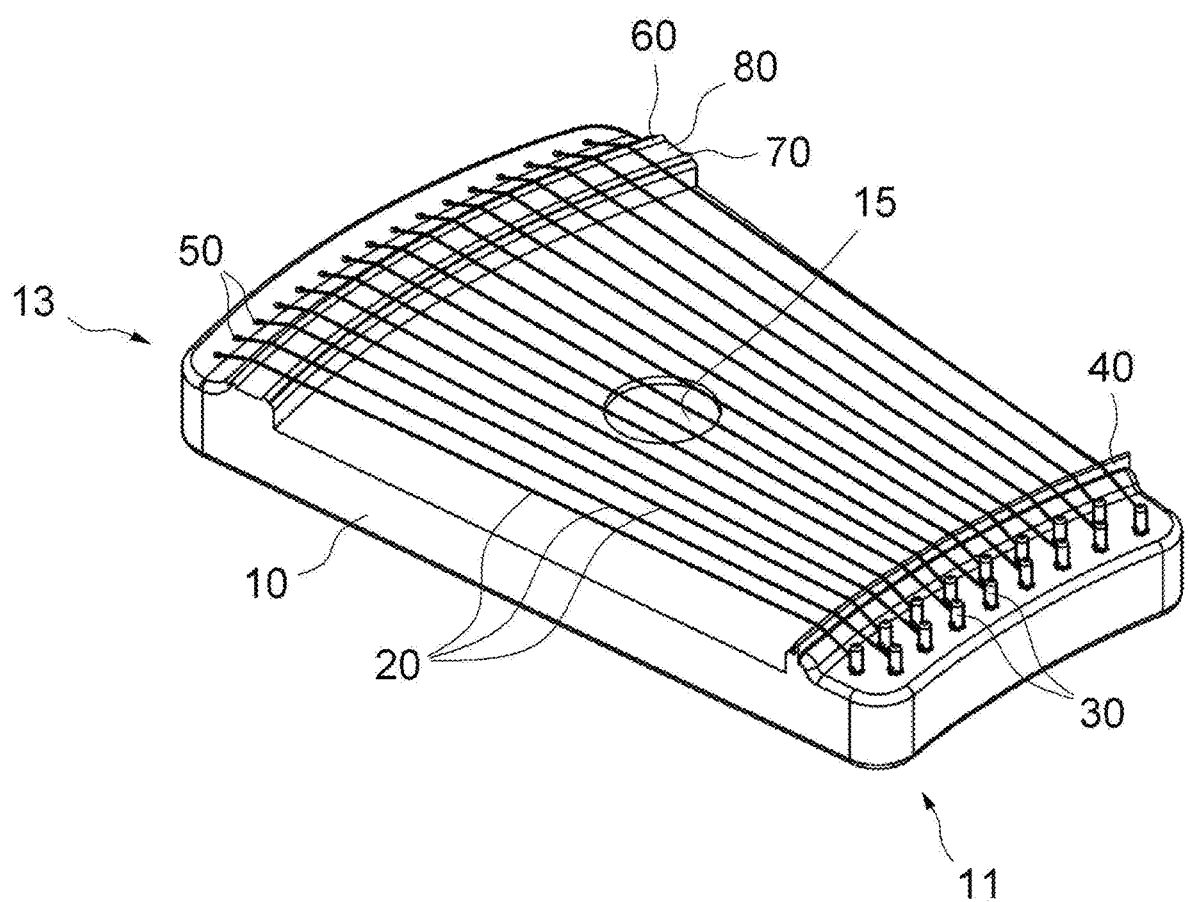
FIG. 1 is a perspective view illustrating an educational string instrument according to an embodiment of the present invention.
Figure 2:
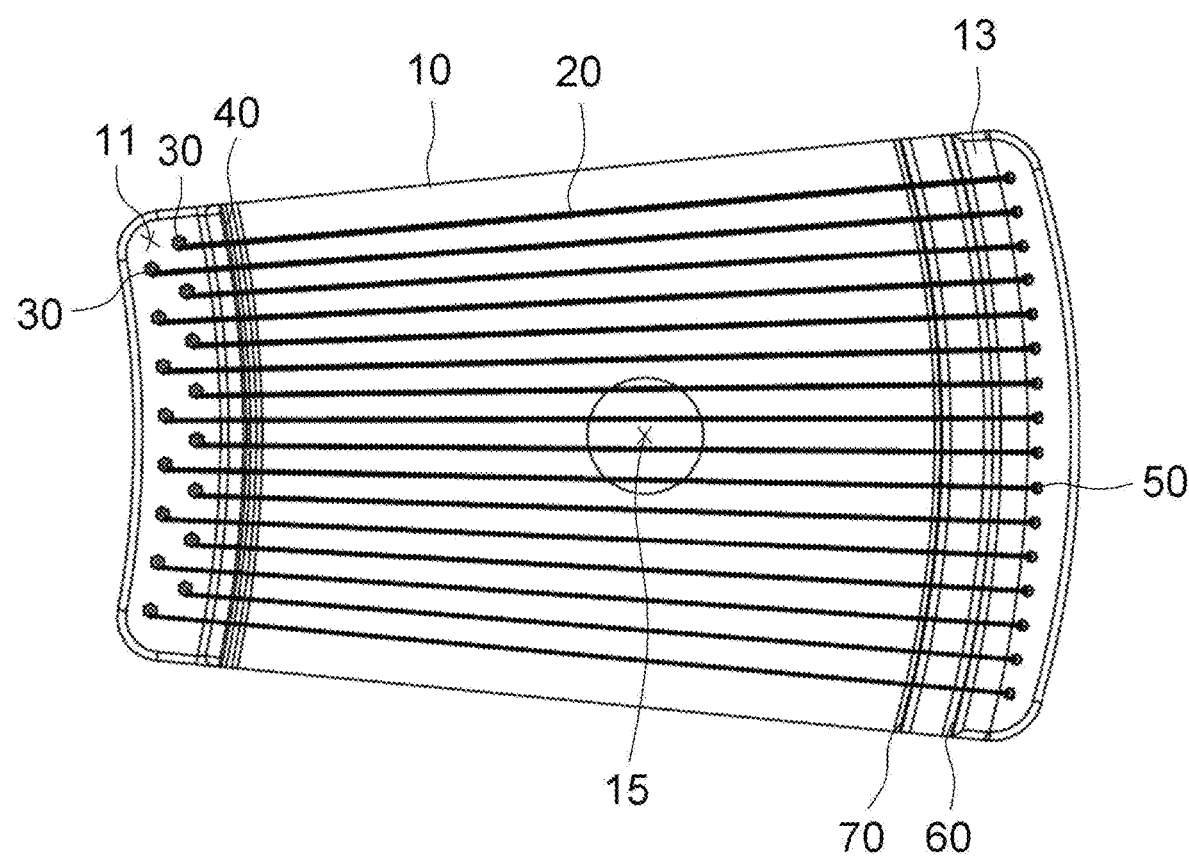
FIG. 2 is a top view illustrating the educational string instrument of FIG. 1.
Figure 3:
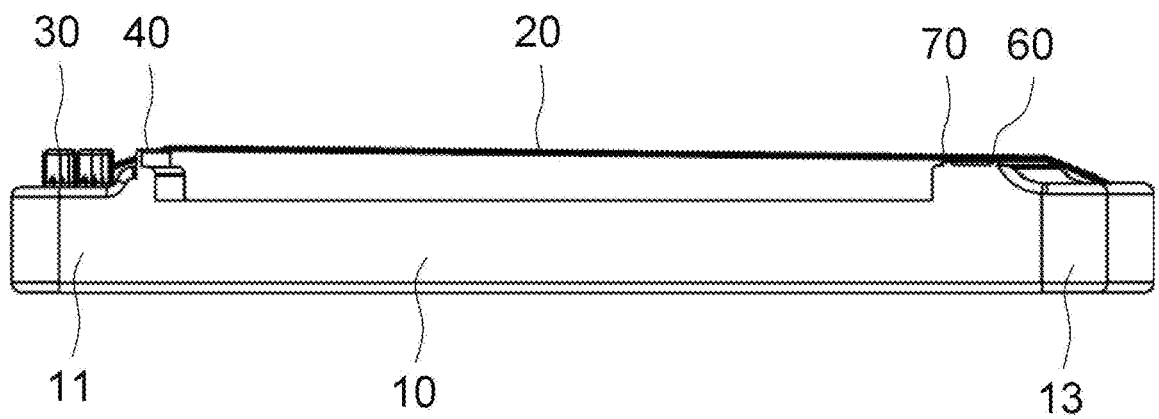
FIG. 3 is a side view illustrating the educational string instrument of FIG. 1.

FIG. 1 is a perspective view illustrating an educational string instrument according to an embodiment of the present invention. FIG. 2 is a top view illustrating the educational string instrument of FIG. 1. FIG. 3 is a side view illustrating the educational string instrument of FIG. 1.

Figure 4:
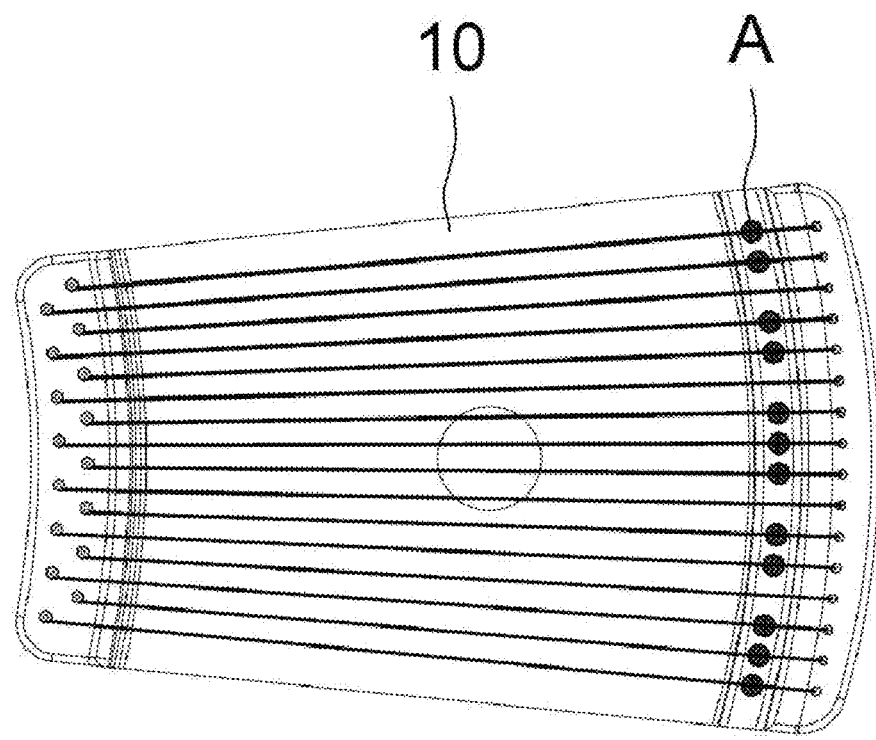
FIGS. 4 to 6 are top views illustrating educational string instruments according to other embodiments of the present invention.
Figure 5:
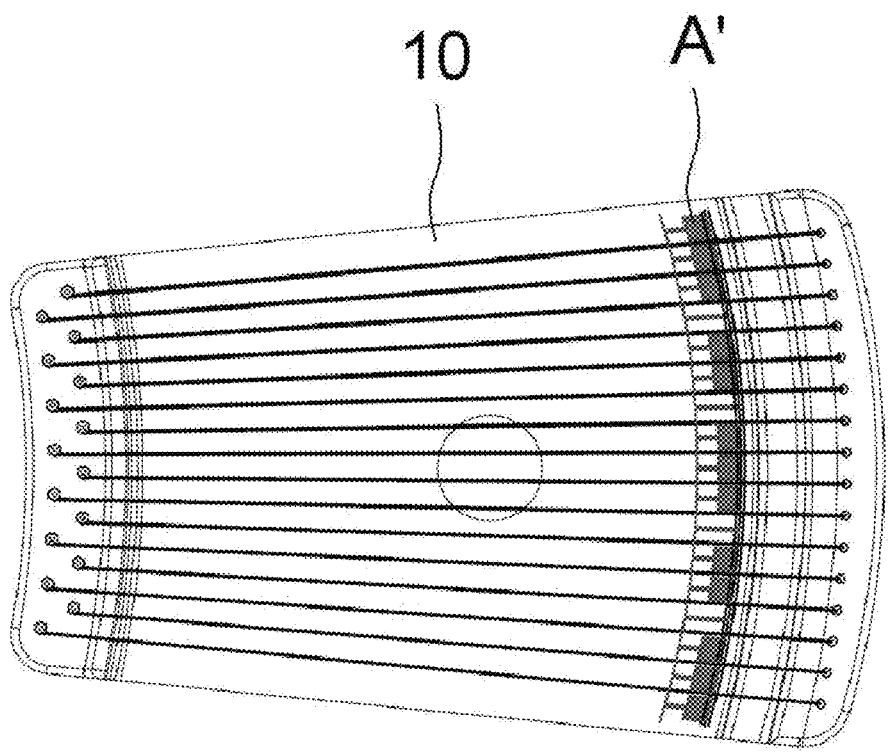
Figure 6:
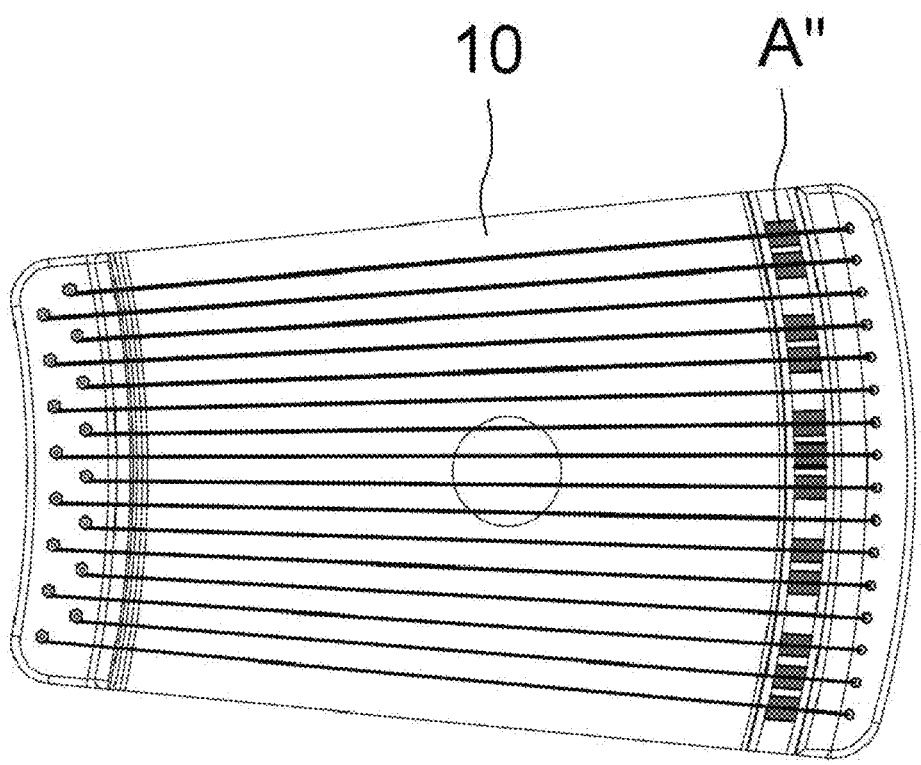

Although an educational string instrument of FIGS. 1 to 6 is illustrated to have 16 strings, and an educational string instrument of FIG. 6 is illustrated to have 10 strings, these are only examples, and the number of strings may increase or reduce according to needs of a producer or a player.

As shown in FIGS. 1 to 3, an educational string instrument according to the present invention may be configured to comprise: a body 10, a plurality of strings 20, a plurality of tuning devices 30, a saddle 40, a plurality of fixing parts 50, a nut 60, and a single fret 70.

The body 10 is a component forming an overall appearance of an educational string instrument according to an embodiment of the present invention. The body 10 may be made of wood, synthetic wood, plastic materials, or metal materials. A sound hole 15 is formed in a central portion of the body 10 to further enrich sound.

As shown in drawings, the body 10 has a trapezoidal shape as a whole. A wide width portion of the body 10, in which a fingerboard part 80 is formed, is defined as a head portion 13, and a narrow width portion of the body 10 is defined as a bottom portion 11. The widths in the head portion 13 and the bottom portion 11 may be reversed each other.

As shown in the drawings, the head portion 13 may be formed to be curved or rounded outward, and the bottom portion 11 may be formed to be curved or rounded inward. With this structure, a user can use the instrument more conveniently.

The plurality of the fixing parts 50 are installed in the head portion 13. As shown, the plurality of fixing parts 50 may be installed in a line.

The plurality of tuning devices 30 are installed in the bottom portion 11, and as shown, the plurality of the tuning devices 30 may be installed in a zigzag line.

Here, the positions of the tuning devices 30 and the fixing parts 50 may be interchanged.

The string 20 is respectively fixed to the head portion 13 and the bottom portion 11 through the fixing part 50 and the tuning device 30 of the body 10. More specifically, an end of each of the plurality of strings 20 is wound around the tuning device 30 installed on the bottom portion 11 of the body 10, and the other end of each of the strings 20 is fixed to the fixing part 50 installed on the head portion 13 of the body 10. The strings 20 are illustrated to be composed of 16 strings in the drawings, but the present invention is not limited thereto. The number of the strings 20 may be changed as needed, such as 8, 12, or 24. In addition, the strings 20 may be composed of at least 7 or more strings to play notes of Do, Re, Mi, Fa, Sol, La, and Si in a basic major scale. In addition, the string 20 may be composed of a metal string or a nylon string. The plurality of strings 20 may be composed of different types of strings, respectively, or may be composed of the same type of a string. Furthermore, in some embodiments, the strings 20 are configured that as each of the strings 20 goes in a transverse direction, a connection length of each of the strings 20 becomes shorter in sequence and makes a higher note. In some embodiments, the strings 20 are configured that as each of the strings 20 goes in a transverse direction, a thickness of each of the strings 20 becomes thinner in sequence and make a higher note.

When the user plucks or strikes the string 20, the instrument makes sound accordingly. The reference sound of each string 20 may be adjusted by the tuning device 30.

The saddle 40 is installed on an inner side of the tuning device 30, and the string 20 is spaced apart from the body 10 by a predetermined distance by the saddle 40 and the nut 60 to be described later.

The single fret 70 is installed on an inner side of the nut 60 and is spaced apart from the string 20 in an ordinary state. When a user fingers the fingerboard part 80 positioned between the nut 60 and the single fret 70, the string 20 and the single fret 70 come into contact. In this state, if the string 20 that is in contact with the single fret 70 is plucked, a length of a vibrating portion of the string 20 reduces and is shorter than the entire length of the same string 20. Accordingly, a note of the sound produced from the string 20 in this state is a semitone higher than the reference note of the string 20. The plurality of strings 20 are tuned according to a natural major scale, respectively, and thus, the string 20 produces sound of the reference note in the major scale. Meanwhile, when a user fingers the fingerboard part 80, a length of a vibrating portion of the string 20 is shortened, and sound whose note is a semitone higher than the reference note of the string 20 is produced. As shown in FIGS. 1 to 3, the single fret 70 may be installed throughout a plurality of strings 20. In other words, the single fret 70 may be installed over a transverse direction of the entire body 10. If necessary, the single fret 70 may be installed only on a portion of the plurality of strings 20. In addition, the single fret 70 may be installed integrally or separately on the body 10.

Meanwhile, the fingerboard 80 may be marked with key labels A, A' through which a user can intuitively perceive a scale. An example of this will be described in more detail with reference to FIGS. 4 and 5.

FIGS. 4 to 6 are top views of other embodiments of educational string instruments according to the present invention. In FIGS. 4 to 6, only shapes of key labels on the fingerboard part 80 are different. In FIG. 4, key labels A are formed in a circle shape. In FIG. 5, key labels A' are formed in a rectangular shape. In FIG. 6, key labels A" are formed in a piano key type shape.

The key labels A, A', A" are marked only for the strings 20 that produce notes of Do, Re, Fa, Sol, and La in the major scale, and there are no key labels on the other strings 20. Accordingly, the arrangement of the key labels looks the same shape as a piano keyboard as a whole, and even a beginner who has learned only the basics of piano can easily understand what note each string represents.

Figure 7:
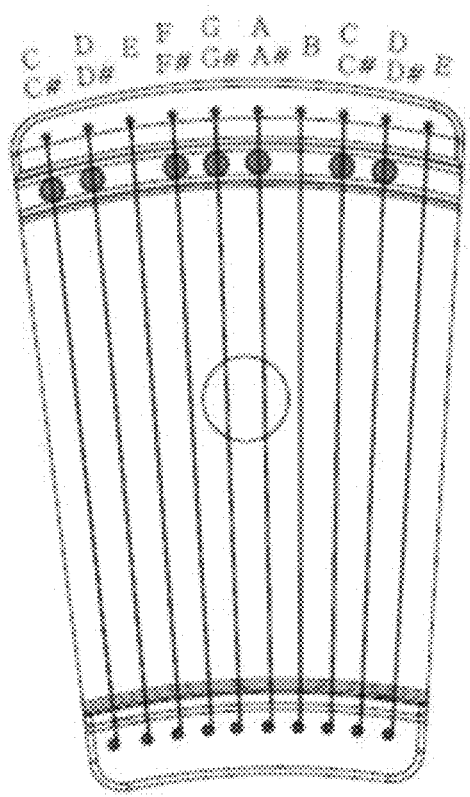
FIGS. 7 and 8 are drawings illustrating educational string instruments having 10 strings according to other embodiments of the present invention.
Figure 8:
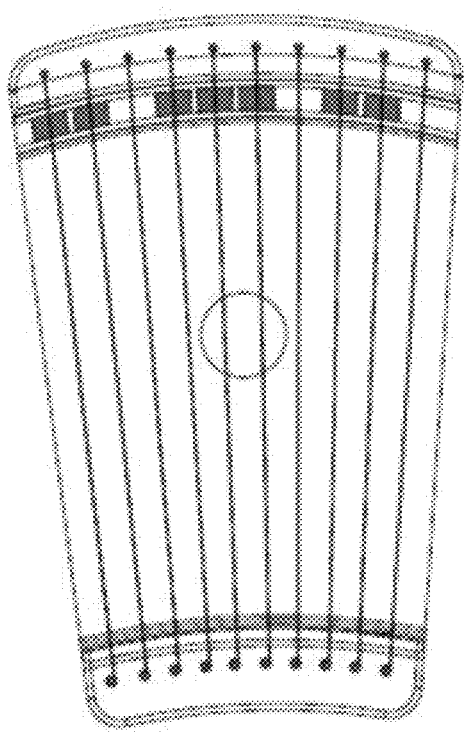

FIGS. 7 and 8 are examples of an educational string instrument consisting of 10 strings, unlike the embodiments of FIGS. 1 to 6. A reference note of each string is C, D, E, F, A, B, C, D, E, respectively, and by fingering the fingerboard 80 marked with the key labels, each note of the strings 20 may be configured to be raised by a semitone to C#, D#, G#, A#, C#, and D#.

According to the embodiments of the present invention with the configuration above, since the present invention has a natural major scale arrangement, which is an advantage of string instruments, a user can intuitively learn sound of each string and can play the instrument immediately.

In the case of playing a score with a key signature, such as sharp # or flat ♭, which is the most difficult part to learn in an instrument, the present invention enables a user to play the score simply by fingering or pressing a fret of a string corresponding to a note with a key signature with one hand without changing the shape of the other hand.

In the case of playing chords, the present invention enables a user to easily play chords by skipping one note in a natural major scale arrangement while keeping the shape of the hand in the same position.

In addition, the present invention can be played with various playing techniques such as arpeggios and strokes.

Furthermore, a string instrument of the present invention is suitable both for stage performance and music education because of its compact size and good portability.

An educational string instrument of the present invention is not limited to the configurations and operation methods of embodiments described above. The embodiments above can be configured as various modifications or equivalents by selectively combining all or part of each embodiment.

What is claimed is:

1. An educational string instrument comprising:
   a body provided with a head portion and a bottom portion;
   a nut installed on the head portion;
   a saddle installed on the bottom portion;
   a plurality of fixing parts installed on an outer side of the nut of the body;
   a plurality of tuning devices installed on an outer side of the saddle of the body;
   a plurality of strings supported by the fixing parts and the tuning devices and installed to be spaced apart from the body by the nut and the saddle, and
   a single fret installed to be inwardly spaced apart from an inner side of the nut to form a fingerboard part and raising an original note of the string by a semitone by fingering the fingerboard part to be in contact with the string and shortening a length of a vibrating portion of the string when plucking the string, wherein in an ordinary state, the single fret is positioned to be spaced apart from the string.

2. The educational string instrument of claim 1, wherein the body is provided with a sound hole formed in a center thereof.

3. The educational string instrument of claim 1, wherein each of the plurality of strings is tuned according to a natural major scale.

4. The educational string instrument of claim 3, wherein the strings are 7 or more.

5. The educational string instrument of claim 4, wherein the single fret is formed throughout the plurality of strings.

6. The educational string instrument of claim 5, wherein the fingerboard is marked with key labels.

7. The educational string instrument of claim 1, wherein the tuning devices are installed alternately.

8. The educational string instrument of claim 1, wherein the head portion of the body is formed to be curved outward, and the bottom portion of the body is formed to be curved inward.

9. The educational string instrument of claim 1, wherein the body is made of wood and has a plate shape.

10. The educational string instrument of claim 1, wherein the plurality of strings is the same type of string,
    wherein as each of the strings goes in a transverse direction, a connection length of each of the strings is configured to be shorter in sequence and make a higher note.

11. The educational string instrument of claim 1, wherein as each of the strings goes in a transverse direction, a thickness of each of the strings is configured to be thinner in sequence and make a higher note.

* * * * *